(12) United States Patent
Surdak

(10) Patent No.: US 12,505,416 B2
(45) Date of Patent: Dec. 23, 2025

(54) SYSTEM, METHOD, AND COMPUTER PROGRAM PRODUCT FOR A DISTRIBUTED, CRYPTOGRAPHICALLY SECURED PROOF-OF-INTENT TRANSACTION NETWORK

(71) Applicant: Christopher Walter Surdak, Redlands, CA (US)

(72) Inventor: Christopher Walter Surdak, Redlands, CA (US)

(73) Assignee: ReLeaf Financial, Incorporated, Newark, DE (US)

( * ) Notice: Subject to any disclaimer, the term of this patent is extended or adjusted under 35 U.S.C. 154(b) by 86 days.

(21) Appl. No.: 16/274,756

(22) Filed: Feb. 13, 2019

(65) Prior Publication Data
US 2019/0251527 A1     Aug. 15, 2019

Related U.S. Application Data

(60) Provisional application No. 62/630,727, filed on Feb. 14, 2018.

(51) Int. Cl.
*G06Q 20/06* (2012.01)
*G06Q 20/02* (2012.01)
(Continued)

(52) U.S. Cl.
CPC ........ *G06Q 20/0658* (2013.01); *G06Q 20/02* (2013.01); *G06Q 20/3674* (2013.01);
(Continued)

(58) Field of Classification Search
CPC ........ G06Q 20/40–40975; G06Q 20/06–0658; G06Q 20/02–027; G06Q 20/3678;
(Continued)

(56) References Cited

U.S. PATENT DOCUMENTS

| | | | |
|---|---|---|---|
| 6,470,448 B1 * | 10/2002 | Kuroda | G06Q 20/389 |
| | | | 713/176 |
| 2017/0116608 A1 * | 4/2017 | Forzley | G06Q 20/4014 |

(Continued)

FOREIGN PATENT DOCUMENTS

| | | | | |
|---|---|---|---|---|
| WO | WO-2018089815 A1 * | 5/2018 | | G06F 16/00 |
| WO | WO-2019232789 A1 * | 12/2019 | | G06N 7/005 |

OTHER PUBLICATIONS

Armknecht, F. et al. Ripple Overview and Outlook. TRUST 2015, LNCS 9229, pp. 163-180, 2015. M. Conti et al. (Eds.) Springer International Publishing Switzerland 2015. (Year: 2015).*

(Continued)

*Primary Examiner* — Jacob C. Coppola
(74) *Attorney, Agent, or Firm* — K&L Gates LLP

(57) ABSTRACT

Provided is a computer implemented method of authorizing transactions in a blockchain network of participant systems including a first system that sends transaction data to a second system that generates a notary request including the transaction data, at least one notary system and at least one witness system. The method includes the notary system: accepting the notary request from the second system; transmitting the transaction data to the witness systems; determining a subset of responsive witness systems; determining that a required number of affirmative responses has been received from the responsive witness systems; generating a block based on the transaction data; and publishing the block to a ledger of the blockchain network.

16 Claims, 6 Drawing Sheets

(51) Int. Cl.
*G06Q 20/36* (2012.01)
*G06Q 20/40* (2012.01)
*H04L 9/06* (2006.01)

(52) U.S. Cl.
CPC ....... *G06Q 20/3678* (2013.01); *G06Q 20/401* (2013.01); *H04L 9/0637* (2013.01)

(58) Field of Classification Search
CPC ............. G06Q 20/3674; G06Q 20/401; G06Q 2220/00; H04L 9/0637; H04L 2209/56; H04L 2209/38; H04L 9/3239
See application file for complete search history.

(56) References Cited

U.S. PATENT DOCUMENTS

| | | | | |
|---|---|---|---|---|
| 2017/0301047 | A1* | 10/2017 | Brown | G06Q 20/382 |
| 2017/0323392 | A1* | 11/2017 | Kasper | H04L 63/123 |
| 2017/0352012 | A1* | 12/2017 | Hearn | G06Q 50/18 |
| 2018/0025435 | A1* | 1/2018 | Karame | H04L 9/3236 705/30 |
| 2018/0097779 | A1* | 4/2018 | Karame | H04L 9/3247 |
| 2018/0109541 | A1* | 4/2018 | Gleichauf | H04W 12/06 |
| 2018/0114218 | A1* | 4/2018 | Konik | G06Q 40/08 |
| 2018/0337769 | A1* | 11/2018 | Gleichauf | G06Q 20/308 |
| 2018/0337882 | A1* | 11/2018 | Li | H04L 61/35 |
| 2019/0102163 | A1* | 4/2019 | Witherspoon | G07C 13/00 |
| 2019/0130394 | A1* | 5/2019 | Stollman | H04L 9/3239 |
| 2019/0251007 | A1* | 8/2019 | Mac Brough | G06F 16/27 |
| 2019/0251199 | A1* | 8/2019 | Klianev | G06Q 40/04 |
| 2019/0253240 | A1* | 8/2019 | Treat | H04L 9/3297 |
| 2020/0242593 | A1* | 7/2020 | Deshpande | G06Q 20/0655 |
| 2020/0242602 | A1* | 7/2020 | Jiang | G06Q 20/401 |

OTHER PUBLICATIONS

Gruber, Damian & Li, Wenting & Karame, Ghassan. (2018). Unifying Lightweight Blockchain Client Implementations. available via https://www.researchgate.net/publication/326833126_Unifying_Lightweight_Blockchain_Client_Implementations (Jan. 2018 attribution). (Year: 2018).*

K. Li, H. Li, H. Hou, K. Li and Y. Chen, "Proof of Vote: A High-Performance Consensus Protocol Based on Vote Mechanism & Consortium Blockchain," 2017 IEEE 19th International Conference on High Performance Computing and Communications; 2017, pp. 466-473, doi: 10.1109/HPCC-SmartCity-DSS.2017.61. (Year: 2017).*

C. Decker and R. Wattenhofer, "Information propagation in the Bitcoin network," IEEE P2P 2013 Proceedings, Trento, Italy, 2013, pp. 1-10, doi: 10.1109/P2P.2013.6688704. (Year: 2013).*

Li et al., "Proof of Vote: A High-Performance Consensus Protocol Based on Vote Mechanism & Consortium Blockchain," 2017 IEEE 19th International Conference on High Performance Computing and Communications, Bangkok, Thailand, 2017, pp. 466-473, doi: 10.1109/HPCC-SmartCity-DSS.2017.61. (Year: 2017).*

Antonopoulos, Andreas, "Mastering Bitcoin: Unlocking Digital Crypto-Currencies," O'Reilly Media, Inc., all pages. (Year: 2014).*

* cited by examiner

SYSTEM, METHOD, AND COMPUTER PROGRAM PRODUCT FOR A DISTRIBUTED, CRYPTOGRAPHICALLY SECURED PROOF-OF-INTENT TRANSACTION NETWORK

CROSS REFERENCE TO RELATED APPLICATION

This application claims the benefit of U.S. Provisional Application No. 62/630,727, filed Feb. 14, 2018, the entire disclosure of which is hereby incorporated by reference in its entirety.

BACKGROUND

1. Field

This disclosure relates generally to blockchain networks and, in some embodiments or aspects, to a system, a method, and/or a computer program product for implementing distributed cryptographically secured transactions in a blockchain network using proof-of-intent to authenticate and/or authorize the transactions through interaction of independent third parties.

2. Technical Considerations

Blockchain has emerged as a relatively new technology implemented to verify transactions involving digital currencies. Generally, a blockchain is a networked data structure that stores and maintains a list of transactions. A ledger that leverages blockchain technology is electronically distributed across millions of computers, such that a centralized version of the ledger may not exist. Bocks of information that are identical across the network may be subsequently stored to the blockchain, which may eliminate an ability of a single entity to control the ledger. Thus, blockchain technology makes it extremely difficult to manipulate or corrupt the data stored on a ledger, because the potential for single-point failure may be eliminated. For example, blockchain-based technologies, such as Bitcoin and/or the like, have operated since 2008 without significant disruption.

Blockchain technology leverages an expansive network of computers to ensure that each block of transactions is authentic, and that the creator of each block is authorized to add that block to the chain. Existing blockchain technologies approach authentication in several ways. For example, the Proof-of-Work approach leverages the network of computers to collectively solve a complex mathematical puzzle. For ensuring the security of the blockchain, these puzzles may be extremely difficult and use relatively large amounts of computational resources to solve. However, the amount of computational resources required to solve each mathematical puzzle increases each time a new block of transactions is added to the chain. Thus, the Proof-of-Work approach is inherently inefficient. As another example, the Proof-of-Stake approach does not require relatively large amounts of computational resources and, instead, leverages (e.g., puts at stake, etc.) a value of an owner's cryptocurrency to create a new or next block in the chain. If an unauthorized block is created, the value of the cryptocurrency put at stake is damaged, which deters or prevents the creation of unauthorized blocks in the chain. However, the Proof-of-Stake approach may allow participants with larger amounts of cryptocurrency to wield more influence and control over the blockchain and/or may be inherently less secure.

Therefore, there is a need for improving cryptographically secured transactions and/or enhancing an efficiency and/or a security of blockchain networks.

SUMMARY

Accordingly, provided are improved methods, systems, and products for authorizing a cryptographically secure transaction that may improve a distributed, cryptographically secured transaction and/or enhance the efficiency and/or the security of a blockchain network.

According to some non-limiting embodiments or aspects, provided is a computer-implemented method of authorizing transactions in a blockchain network comprising a plurality of participant systems, wherein a first system of the plurality of participant systems sends transaction data to a second system of the plurality of participant systems, and wherein the second system generates a notary request comprising the transaction data, the method comprising: accepting, by a notary system of the plurality of participant systems, the notary request from the second system of the plurality of account holder systems; transmitting, by the notary system, at least a portion of the transaction data to a plurality of witness systems, the plurality of witness systems comprising at least a subset of the plurality of participant systems; determining, by the notary system, a subset of responsive witness systems from the plurality of witness systems; determining, by the notary system, that a required number of affirmative responses is received, wherein each affirmative response confirms that at least a portion of the transaction data sent to the subset of responsive witness systems is approved by the first system of the plurality of participant systems; in response to determining that the required number of responses from each of the subset of responsive witness systems is received, generating, by the notary system, at least one block at least partially based on the transaction data; and publishing, by the notary system, the at least one block to a blockchain ledger of the blockchain network.

In some non-limiting embodiments or aspects, the notary system is selected, by the second system, from a plurality of notary systems of the plurality of participating systems, wherein each of the plurality of notary systems is verified, and wherein each of the plurality of notary systems maintains a complete copy of the blockchain ledger.

In some non-limiting embodiments or aspects, the notary system is randomly selected from the plurality of notary systems, and wherein the notary system is not a notary system that last published a block to the blockchain network.

In some non-limiting embodiments or aspects, the notary system is selected by determining whether the notary system is managing a current number of transactions that is less than a maximum allowable number of transactions.

In some non-limiting embodiments or aspects, the notary system is selected by determining that a bid accompanying the acceptance of the notary system is lower than another bid accompanying another acceptance of another notary system of the plurality of notary systems.

In some non-limiting embodiments or aspects, the method further includes determining, by the notary system, a required number of affirmative responses from the plurality of witness systems.

In some non-limiting embodiments or aspects, the required number of affirmative responses from the plurality of witness systems is determined based on: a transaction amount; a sender balance percentage based on the transaction amount and an account balance of the first system; and a receiver balance percentage based on the transaction amount and an account balance of the second system.

In some non-limiting embodiments or aspects, the required number of affirmative responses from the plurality of witness systems is determined by the first system, if the number of affirmative responses determined by the first system is not less than a number of responses determined based on: a transaction amount; a sender balance percentage based on the transaction amount and an account balance of the first system; and a receiver balance percentage based on the transaction amount and an account balance of the second system.

In some non-limiting embodiments or aspects, the transaction data comprises at least one of the following: data associated with an account identifier of the first system, a public encryption key of the first system, a starting account balance of the first system, an ending account balance of the first system, a transaction amount, an account identifier of the second system, a public encryption key of the second system, a starting account balance of the second system, an ending account balance of the second system, or any combination thereof.

In some non-limiting embodiments or aspects, the at least a portion of the transaction data sent to the subset of responsive witness systems is approved by the first system based on the at least a portion of the transaction and a private encryption key retained exclusively by the first system.

In some non-limiting embodiments or aspects, the notary request further comprises additional data associated with the second system, bundled with the transaction data by the second system.

In some non-limiting embodiments or aspects, the required number of affirmative responses received by the notary system further comprises data including at least one of: a key, a timestamp, a transaction amount associated with the transaction data, or any combination thereof.

In some non-limiting embodiments or aspects, the transaction data is cryptographically integrated into the at least one block.

In some non-limiting embodiments or aspects, the cryptographic integration is based on at least one hash function.

In some non-limiting embodiments or aspects, the notary system receives a fee in response to publishing the at least one block to the blockchain network.

In some non-limiting embodiments or aspects, the subset of responsive witness systems receives a fee in response to publishing the at least one block to the blockchain network.

According to some non-limiting embodiments or aspects, provided is a system for authorizing transactions in a blockchain network comprising a plurality of participant systems, wherein a first system of the plurality of participant systems sends transaction data to a second system of the plurality of participant systems, and wherein the second system generates a notary request comprising the transaction data, the system comprising a notary system including at least one processor programmed or configured to: accept a notary request from a second system of a plurality of account holder systems, the notary request comprising transaction data received from a first system of a plurality of account holder systems; transmit at least a portion of the transaction data to a plurality of witness systems, the plurality of witness systems comprising at least a subset of the plurality of participant systems; determine a subset of responsive witness systems from the plurality of witness systems; determine that a required number of affirmative responses is received, wherein each affirmative response confirms that at least a portion of the transaction data sent to the subset of responsive witness systems was approved by the first system of the plurality of participant systems; generate at least one block at least partially based on the transaction data, in response to determining that the required number of responses from each of the subset of responsive witness systems is received; and publish the at least one block to the blockchain network.

In some non-limiting embodiments or aspects, the transaction data comprises at least one of the following: data associated with an account identifier of the first system; a public encryption key of the first system; a starting account balance of the first system; an ending account balance of the first system; a transaction amount; an account identifier of the second system; a public encryption key of the second system; a starting account balance of the second system; an ending account balance of the second system; or any combination thereof.

In some non-limiting embodiments or aspects, at least a portion of the transaction data sent to the subset of responsive witness systems is approved by the first system based on the at least a portion of the transaction and a private encryption key retained exclusively by the first system.

According to some non-limiting embodiments or aspects, provided is a computer program product for authorizing transactions in a blockchain network comprising a plurality of participant systems, wherein a first system of the plurality of participant systems sends transaction data to a second system of the plurality of participant systems, and wherein the second system generates a notary request comprising the transaction data, comprising at least one non-transitory computer-readable medium including program instructions that, when executed by at least one processor of a notary system, cause the at least one processor to: accept a notary request from a second system of a plurality of account holder systems, the notary request comprising transaction data received from a first system of a plurality of account holder systems; transmit at least a portion of the transaction data to a plurality of witness systems, the plurality of witness systems comprising at least a subset of the plurality of participant systems; determine a subset of responsive witness systems from the plurality of witness systems; determine that a required number of affirmative responses is received, wherein each affirmative response confirms that at least a portion of the transaction data sent to the subset of responsive witness systems was approved by the first system of the plurality of participant systems; generate, by the at least one processor, at least one block at least partially based on the transaction data, in response to determining that the required number of responses from each of the subset of responsive witness systems is received; and publish the at least one block to the blockchain network.

According to some non-limiting embodiments or aspects, provided is a computer-implemented method of authorizing transactions in a blockchain network comprising a plurality of participant systems, wherein a first system of the plurality of participant systems sends transaction data to a second system of the plurality of participant systems, wherein the second system generates a notary request comprising the transaction data, and wherein a notary system of the plurality of participant systems accepts the notary request from the second system, the method comprising: receiving, by a witness system of the plurality of participant systems, at least a portion of the transaction data from the notary request accepted by the notary system; determining, by the witness system, that the at least a portion of the transaction data received from the notary request is approved by the first system; in response to determining that the at least a portion of the transaction data from the notary request is approved by the first system, generating, by the witness system, an affirmative response to the notary request; and transmitting, by the witness system, the affirmative response to the notary system, wherein the affirmative response is configured to cause the notary system to generate at least one block at least partially based on the transaction data and publish the at least one block to a blockchain ledger of the blockchain network.

Further non-limiting embodiments or aspects are set forth in the following numbered clauses:

Clause 1. A computer-implemented method of authorizing transactions in a blockchain network comprising a plurality of participant systems, wherein a first system of the plurality of participant systems sends transaction data to a second system of the plurality of participant systems, and wherein the second system generates a notary request comprising the transaction data, the method comprising: accepting, by a notary system of the plurality of participant systems, the notary request from the second system of the plurality of account holder systems; transmitting, by the notary system, at least a portion of the transaction data to a plurality of witness systems, the plurality of witness systems comprising at least a subset of the plurality of participant systems; determining, by the notary system, a subset of responsive witness systems from the plurality of witness systems; determining, by the notary system, that a required number of affirmative responses is received, wherein each affirmative response confirms that at least a portion of the transaction data sent to the subset of responsive witness systems is approved by the first system of the plurality of participant systems; in response to determining that the required number of responses from each of the subset of responsive witness systems is received, generating, by the notary system, at least one block at least partially based on the transaction data; and publishing, by the notary system, the at least one block to a blockchain ledger of the blockchain network.

Clause 2. The method of clause 1, wherein the notary system is selected, by the second system, from a plurality of notary systems of the plurality of participating systems, wherein each of the plurality of notary systems is verified, and wherein each of the plurality of notary systems maintains a complete copy of the blockchain ledger.

Clause 3. The method of any of clauses 1 and 2, wherein the notary system is randomly selected from the plurality of notary systems, and wherein the notary system is not a notary system that last published a block to the blockchain network.

Clause 4. The method of any of clauses 1-3, wherein the notary system is selected by determining whether the notary system is managing a current number of transactions that is less than a maximum allowable number of transactions.

Clause 5. The method of any of clauses 1-4, wherein the notary system is selected by determining that a bid accompanying the acceptance of the notary system is lower than another bid accompanying another acceptance of another notary system of the plurality of notary systems.

Clause 6. The method of any of clauses 1-5, further comprising: determining, by the notary system, a required number of affirmative responses from the plurality of witness systems.

Clause 7. The method of any of clauses 1-6, wherein the required number of affirmative responses from the plurality of witness systems is determined based on: a transaction amount; a sender balance percentage based on the transaction amount and an account balance of the first system; and a receiver balance percentage based on the transaction amount and an account balance of the second system.

Clause 8. The method of any of clauses 1-7, wherein the required number of affirmative responses from the plurality of witness systems is determined by the first system, if the number of affirmative responses determined by the first system is not less than a number of responses determined based on: a transaction amount; a sender balance percentage based on the transaction amount and an account balance of the first system; and a receiver balance percentage based on the transaction amount and an account balance of the second system.

Clause 9. The method of any of clauses 1-8, wherein the transaction data comprises at least one of the following: data associated with an account identifier of the first system, a public encryption key of the first system, a starting account balance of the first system, an ending account balance of the first system, a transaction amount, an account identifier of the second system, a public encryption key of the second system, a starting account balance of the second system, an ending account balance of the second system, or any combination thereof.

Clause 10. The method of any of clauses 1-9, wherein the at least a portion of the transaction data sent to the subset of responsive witness systems is approved by the first system based on the at least a portion of the transaction and a private encryption key retained exclusively by the first system.

Clause 11. The method of any of clauses 1-10, wherein the notary request further comprises additional data associated with the second system, bundled with the transaction data by the second system.

Clause 12. The method of any of clauses 1-11, wherein the required number of affirmative responses received by the notary system further comprises data including at least one of: a key, a timestamp, a transaction amount associated with the transaction data, or any combination thereof.

Clause 13. The method of any of clauses 1-12, wherein the transaction data is cryptographically integrated into the at least one block.

Clause 14. The method of any of clauses 1-13, wherein the cryptographic integration is based on at least one hash function.

Clause 15. The method of any of clauses 1-14, wherein the notary system receives a fee in response to publishing the at least one block to the blockchain network.

Clause 16. The method of any of clauses 1-15, wherein the subset of responsive witness systems receives a fee in response to publishing the at least one block to the blockchain network.

Clause 17. A system for authorizing transactions in a blockchain network comprising a plurality of participant systems, wherein a first system of the plurality of participant systems sends transaction data to a second system of the plurality of participant systems, and wherein the second system generates a notary request comprising the transaction data, the system comprising a notary system including at least one processor programmed or configured to: accept a notary request from a second system of a plurality of account holder systems, the notary request comprising transaction data received from a first system of a plurality of account holder systems; transmit at least a portion of the transaction data to a plurality of witness systems, the plurality of witness systems comprising at least a subset of the plurality of participant systems; determine a subset of responsive witness systems from the plurality of witness systems; determine that a required number of affirmative responses is received, wherein each affirmative response confirms that at least a portion of the transaction data sent to the subset of responsive witness systems was approved by the first system of the plurality of participant systems; generate at least one block at least partially based on the transaction data, in response to determining that the required number of responses from each of the subset of responsive witness systems is received; and publish the at least one block to the blockchain network.

Clause 18. The system of clause 17, wherein the transaction data comprises at least one of the following: data associated with an account identifier of the first system; a public encryption key of the first system; a starting account balance of the first system; an ending account balance of the first system; a transaction amount; an account identifier of the second system; a public encryption key of the second system; a starting account balance of the second system; an ending account balance of the second system; or any combination thereof.

Clause 19. The system of clauses 17 and 18, wherein the at least a portion of the transaction data sent to the subset of responsive witness systems is approved by the first system based on the at least a portion of the transaction and a private encryption key retained exclusively by the first system.

Clause 20. A computer program product for authorizing transactions in a blockchain network comprising a plurality of participant systems, wherein a first system of the plurality of participant systems sends transaction data to a second system of the plurality of participant systems, and wherein the second system generates a notary request comprising the transaction data, comprising at least one non-transitory computer-readable medium including program instructions that, when executed by at least one processor of a notary system, cause the at least one processor to: accept a notary request from a second system of a plurality of account holder systems, the notary request comprising transaction data received from a first system of a plurality of account holder systems; transmit at least a portion of the transaction data to a plurality of witness systems, the plurality of witness systems comprising at least a subset of the plurality of participant systems; determine a subset of responsive witness systems from the plurality of witness systems; determine that a required number of affirmative responses is received, wherein each affirmative response confirms that at least a portion of the transaction data sent to the subset of responsive witness systems was approved by the first system of the plurality of participant systems; generate, by the at least one processor, at least one block at least partially based on the transaction data, in response to determining that the required number of responses from each of the subset of responsive witness systems is received; and publish the at least one block to the blockchain network.

Clause 21. A computer-implemented method of authorizing transactions in a blockchain network comprising a plurality of participant systems, wherein a first system of the plurality of participant systems sends transaction data to a second system of the plurality of participant systems, wherein the second system generates a notary request comprising the transaction data, and wherein a notary system of the plurality of participant systems accepts the notary request from the second system, the method comprising: receiving, by a witness system of the plurality of participant systems, at least a portion of the transaction data from the notary request accepted by the notary system; determining, by the witness system, that the at least a portion of the transaction data received from the notary request is approved by the first system; in response to determining that the at least a portion of the transaction data from the notary request is approved by the first system, generating, by the witness system, an affirmative response to the notary request; and transmitting, by the witness system, the affirmative response to the notary system, wherein the affirmative response is configured to cause the notary system to generate at least one block at least partially based on the transaction data and publish the at least one block to a blockchain ledger of the blockchain network.

DETAILED DESCRIPTION

Figure 1:
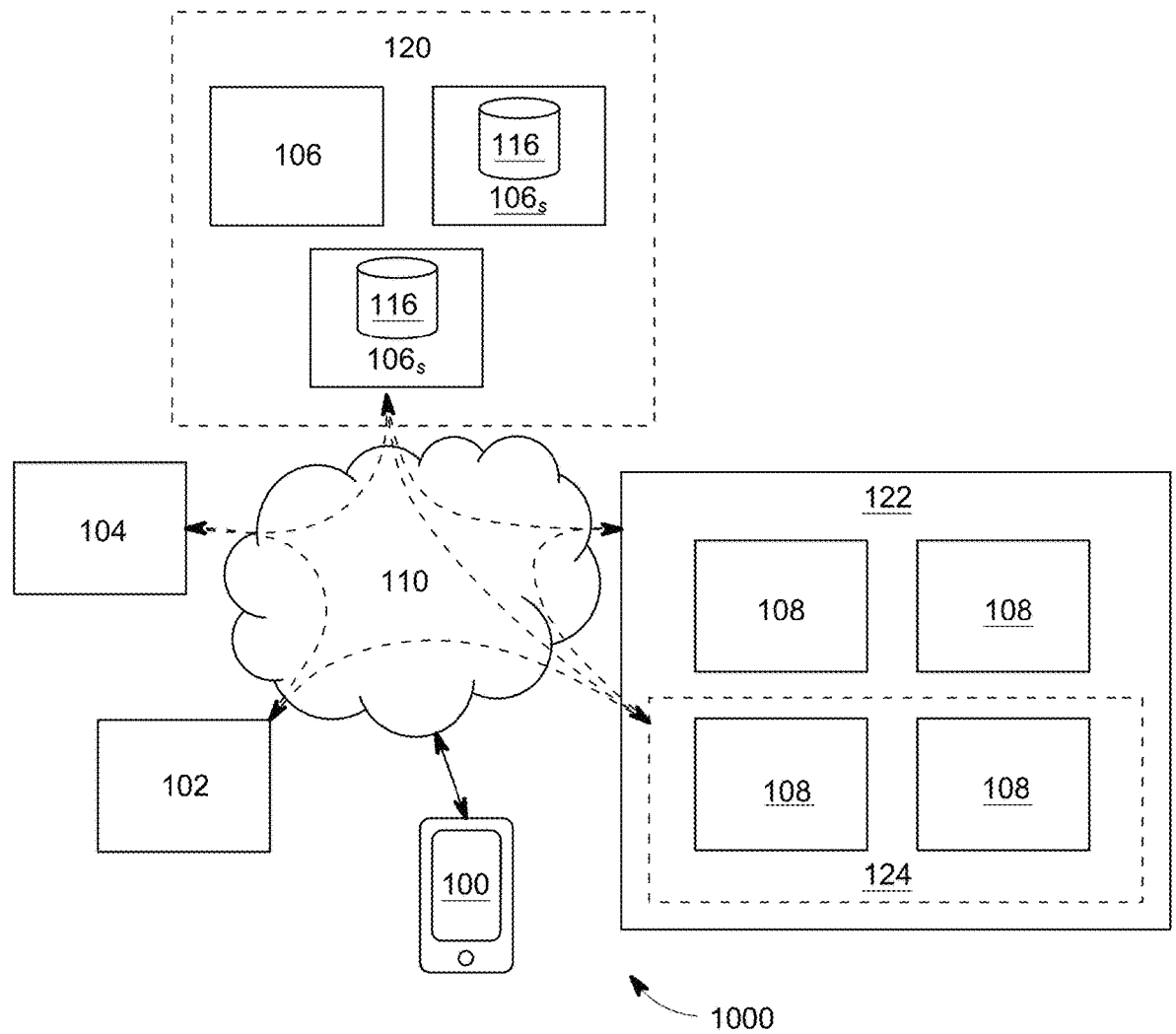
FIG. 1 is a schematic diagram of non-limiting embodiments or aspects of a system for authorizing transactions in a blockchain network described herein.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment may constitute a "system" or a "computing system".

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Provided are improved systems, devices, products, apparatus, and/or methods for improving cryptographically secured transactions and/or enhancing an efficiency and/or a security of blockchain networks. Existing systems leverage expansive networks of computers to ensure that each block of transactions is authentic, and that the creator of each block is authorized to add that block to the chain. These existing systems may use an extensive amount of computational resources and/or allow or present incentives for the fraudulent creation of unauthorized blocks, which undermines the integrity of a blockchain ledger. For example, Bitcoin and Ethereum, which are existing blockchain-based technologies, utilize different methodologies to authenticate and authorize each block, respectively known as Proof-of-Work and Proof-of-Stake.

In the Proof-of-Work approach, third-parties to each transaction, which may be known as or referred to miners, work to solve a complex mathematical puzzle. The mathematical puzzle may be designed to take an average period of time (e.g., ten minutes, etc.) to solve. Thus, the difficulty of solving of each mathematical puzzle scales based on a number of miners working to solve the mathematical puzzle, which may preserve the average (e.g., ten-minute, etc.) solution window. The miner that solves the puzzle is authorized to create the next block in the chain and receives an economic reward in the form of a cryptocurrency, thereby incentivizing the use of resources (e.g., computation resources, memory resources, electric resources, etc.) to participate in the blockchain. Although each mathematical puzzle is difficult to solve, once a solution is determined, it is relatively easy for the rest of the network to verify and thus, authenticate the block.

However, Proof-of-Work is intentionally inefficient, as the cost of solving a mathematical puzzle and creating the next block in the chain may become significantly higher than the financial incentive to participate in solving the mathematical puzzle. The number of computational resources required to solve each mathematical puzzle increases each time a new block of transactions is added to the chain and the ledger subsequently grows. Thus, mining the solution of each mathematical puzzle can cost substantial amounts of money in operating expenses. Depending on the market value of the cryptocurrency, the process can be extremely inefficient. Therefore, participation in a Proof-of-Work blockchain can be extremely cost prohibitive and/or inefficient.

In the Proof-of-Stake approach, the authorization and authentication of blocks does not depend on computational resources. Instead, the value of an owner's cryptocurrency, such as Ethereum, is put at stake when minting (e.g., authorizing and/or creating) the next block of the chain. If an unauthorized block is subsequently created, the value of the cryptocurrency at stake is damaged and/or destroyed. Typically, the amount of the cryptocurrency using a Proof-of-Stake approach is fixed and minters (e.g., entities that authorize and/or create blocks in the blockchain, etc.) are incentivized via transaction fees. Because authorization and authentication in the the Proof-of-Stake approach depends on the value of the cryptocurrency itself, entities or parties that own more of the cryptocurrency can leverage more influence over the blockchain. Thus, a party with the ability to manipulate a blockchain may presumably be disincentivized from manipulating the blockchain. This is perceived to enhance the security of the blockchain.

However, in a Proof-of-Stake blockchain, a party with the ability to manipulate a blockchain may be incentivized to manipulate the blockchain if a value of the fraudulent block exceeds the value at stake. Although many Proof-of-Stake blockchains have implemented processes and rules to deter or prevent such fraudulent manipulation of the chain, Proof-of-Stake networks may remain less secure than the less efficient Proof-of-Work networks.

In this way, existing computer systems have no mechanism for maintaining or increasing an efficiency of authorizing a transaction by parties in a blockchain network that simultaneously controls an influence (e.g., reduces, disincentives manipulation, etc.) of the parties in the blockchain network. Accordingly, existing systems and/or blockchain networks may not provide users with a technically feasible opportunity to efficiently participate in a blockchain network that is not vulnerable to fraudulent manipulation.

Non-limiting embodiments or aspects of the present disclosure are directed to systems, methods, and computer program products for authorizing transactions in a blockchain network comprising a plurality of participant systems that maintain or increase an efficiency of authorizing a transaction by parties in the blockchain network and simultaneously control an influence (e.g., reduce, disincentive manipulation, etc.) of the parties in the blockchain network. In some non-limiting embodiments or aspects, a first system of the plurality of participant systems sends transaction data to a second system of the plurality of participant systems, and the second system generates a notary request comprising the transaction data. At least one processor of a notary system of the plurality of participant systems may accept the notary request from the second system of the plurality of account holder systems; transmit at least a portion of the transaction data to a plurality of witness systems, the plurality of witness systems comprising at least a subset of the plurality of participant systems; determine a subset of responsive witness systems from the plurality of witness systems; determine that a required number of affirmative responses is received, each affirmative response confirming that at least a portion of the transaction data sent to the subset of responsive witness systems is approved by the first system of the plurality of account holder systems; in response to determining that the required number of responses from each of the subset of responsive witness systems is received, generate, at least one block at least partially based on the transaction data; and publish the at least one block to a blockchain ledger of the blockchain network. For example, non-limiting embodiments or aspects of the present disclosure may provide a Proof-of-Intent system for authorizing a transaction in a blockchain by a notary system that receives a required number of affirmative responses from witness systems, which confirm with a sending system, that the transaction is valid. In this way, non-limiting embodiments or aspects of the present disclosure provide: (i) a more efficient blockchain network that may use a fraction of the computational resources used by Proof-of-Work systems and (ii) a more secure blockchain network that eliminates an incentive to authorize a fraudulent transaction (e.g., as exists in Proof-of-Stake systems, etc.). Accordingly, a Proof-of-Intent system according to non-limiting embodiments or aspects described herein may be more accessible, enable more users to participate, and/or be inherently safer than existing blockchain-based systems.

Referring now to FIG. 1, a computer system 1000 for implementing a blockchain based rewards network is depicted in accordance with a non-limiting embodiment or aspect of the present disclosure. As shown in FIG. 1, the system 1000 can include a peer-to-peer network of one or more participant subsystems or nodes, including a first system 102, a second system 104, at least one notary system 106, and at least one witness system 108, all of which can be connected via a communication network 110. However, it will be appreciated that system 1000 can include additional subsystems or nodes beyond those depicted in FIG. 1. The communication network 110 can include the internet, a private network, and/or a similar environment configured for inter-system configuration.

In some non-limiting embodiments or aspects, communication network 110 includes one or more wired and/or wireless networks. For example, communication network 110 includes a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices, and/or networks, fewer systems, devices, and/or networks, different systems, devices, and/or networks, or differently arranged systems, devices, and/or networks than those shown in FIG. 1. Furthermore, two or more participant subsystems or nodes shown in FIG. 1 can be implemented within a single system or a single device, or a single system or a single device shown in FIG. 1 can be implemented as multiple, distributed systems or devices. Additionally, or alternatively, a set of participant subsystems or nodes (e.g., one or more systems, one or more devices, etc.) of system 1000 can perform one or more functions described as being performed by another set of systems or another set of devices of system 1000.

As depicted in FIG. 1, first system 102 can be associated with a sender (e.g., a sending entity, a sending party, etc.) for a transaction and second system 104 can be associated with an intended recipient for the transaction. According to some non-limiting embodiments or aspects, a plurality of participant subsystems or nodes can be sub-divided into a verified network 120 including a subset notary systems 106, and other subsystems of the plurality of participant subsystems (e.g., non-verified notary systems or nodes, etc.) can participate as account holders. A notary system 106 can participate as a "super-user" within the verified network 120. "Super-user" notary systems 106 host and maintain (e.g., exclusively host and maintain, etc.) the distributed ledger 116 within the verified network 120. A "super-user" notary system 106 can have constant access to (e.g., communication with, control over, etc.) other notary systems 106. A "super-user" notary system 106 can be configured to receive new transaction data, compile transaction data across notary systems 106, and/or publish blocks to ledger 116. In some non-limiting embodiments or aspects, first system 102, second system 104, and witness systems 108 can participate as account holders without hosting the distributed ledger (e.g., solely participate as account holders without hosting the distributed ledger, etc.). For example, sending system 102 and/or receiving system 104 for a first transaction can be a witness system 108 for a second (e.g., different, etc.) transaction. In some non-limiting embodiments or aspects, an account holder subsystem 102, 104, 108 may not act as a notary system 106 in a transaction (e.g., in any transaction, etc.).

However, it will be appreciated that according to other non-limiting embodiments or aspects of the present disclosure, each subsystem of the account holder subsystems can serve as the notary system 106 for a particular transaction, and subsequently host and maintain their own version of the distributed ledger 112, 114, 116, 118. For example, the first system 102 can host and maintain its own version of the ledger 112, the second system 104 can host and maintain its own version of the ledger 114, and the at least one witness system 108 can host and maintain its own version of the ledger 118. In such an embodiment of the present disclosure, the notary systems 106 would be in constant communication with other subsystems of the account holder subsystems 102, 104, 108 such that the ledger 112, 114, 116, 118 can be further distributed and maintained. Thus, in embodiments where there is no verified network 120 of notary systems 106, each subsystem of the blockchain network system 1000 can host and maintain its own version of the distributed ledger, and thus be interchangeable.

As depicted in FIG. 1, in some non-limiting embodiments or aspects of the present disclosure, the first system 102 sends transaction data to the second system 104 of the transaction. The transaction data can include data associated with the transaction, including an account identifier of the first system 102, a public encryption key of the first system 102, a starting account balance of the first system 102, an ending account balance of the first system 102, a transaction amount, and an account identifier of the first system 102. In the context of the present disclosure, data "associated with" the transaction further includes data that merely corresponds to data associated with the transaction. For example, the transaction data can include hashed data corresponding to the account balance of the first system 102. Although hashing is commonly used by Bitcoin and Ethereum to encrypt the transaction data from the first system 102, it will be appreciated that other non-limiting means of encrypting or transmitting data are contemplated by the present disclosure, including alternate cryptographic means of encryption, binary code, radio frequency wavelengths, etc.

Notably, the transaction data can include a cryptographically encrypted public key of the first system 102. In some non-limiting embodiments or aspects, at least a portion of the transaction data, such as the public key, can correspond to data that is intentionally excluded from the transaction data and exclusively retained by the first system 102, such as a private key. However, it will be appreciated that additional data associated with the first system 102 can be of value to the transaction and, thus, included in the transaction data sent from the first system 102 to the second system 104.

After receiving the transaction data from the first system 102, the second system 104 can bundle the transaction data with additional data corresponding to the second system 104 into a notary request. Similar to the transaction data, this additional data can be either encrypted or securely transmitted by other means. Non-limiting examples of data corresponding to the second system 104 include a public key of the second system 104, a starting account balance of the second system 104, or an ending account balance of the second system 104. After bundling the additional data with the transaction data from the first system 102 into a notary request, the second system 104 issues the notary request to a notary system 106 selected from a network 120 of notary systems 106. The notary request notifies an available notary system 106 from the network 120 that a pending transaction requires authorization, and provides the notary system 106 with the information necessary to verify that the transaction was intended by the first system 102. The selected notary system 106 is neither the sender nor receiver in a particular transaction, thereby eliminating the motive to fraudulently authorize a transaction.

Once the selected notary system 106 from the verified network of notary systems 120 accepts the notary request from the second system 104, the notary system 106 will send at least a portion of the transaction data from the notary request to a network 122 of at least one witness system 108, thus commencing an opportunity for at least one witness system 108 to respond to the notary request. In response to receiving the notary request, a subset of responsive witness systems 124 from the network 122 of witness systems 108 will take the transaction data from the notary request, and communicate with the first system 102, the identified sender of a particular transaction. According to the non-limiting embodiment depicted in FIG. 1, each witness system 108 of the subset of responsive witness systems 124 will query the first system 102 as to whether at least a portion of the transaction data received from the notary system 106, is based on data that is exclusively maintained by the first system 102. Transaction data can be based on data that is exclusively maintained by the first system 102 if it is mathematically related to the data exclusively maintained by the first system 102. In two non-limiting examples, the transaction data can include the encrypted signature of the first system 102, or the transaction data can be encrypted such that only the first system 102 can decrypt it. Asymmetric and symmetric encryptions are contemplated by the present disclosure, as are the Rivest, Shamir, and Adelman (RSA), and elliptic algorithms, among others.

If the first system 102 confirms that at least a portion of the transaction data received from the notary system is based on data that is exclusively maintained by the first system 102, the query is successful and the witness system 108 from the subset of responsive witness systems 124 will provide the notary system 106 with an affirmative response. For example, if the first system 102 confirms that a public key provided by a witness system 108 from a subset of responsive witness systems 124 corresponds to a private key exclusively retained by the first system 102, the witness system 108 from the subset of responsive witness systems 124 will provide the notary system 106 with an affirmative response.

It is further contemplated that an affirmative response from a witness system 108 can further include metadata associated with the transaction, such as additional data from the first system 102, timestamps, or additional data associated with the transaction. Once the notary system 106 receives a required number of affirmative responses from the subset of responsive witness systems 124, it will conclude that the first system 102 originated the notary request, and subsequently authorized the transaction. Upon authorizing the transaction, each witness system 108 from the subset of responsive witness systems 124 will receive an incentive fee for participating in the transaction. Non-limiting examples of the fee include a monetary incentive, a cryptocurrency incentive, additionally allocated computational resources, or other benefits to the participant systems. In certain non-limiting embodiments or aspects of the present disclosure, a notary system 106 is configured to manage no more than a pre-determined maximum allowable number of transactions at one time. For example, a notary system 106 can be prohibited from simultaneously managing more than ten-thousand transactions.

In response to determining that the required number of affirmative responses from the subset of responsive witness systems 124 has been received, the notary system 106 cryptographically encrypts the transaction data into a new block. Although the most common method of cryptographic encryption is hashing, other known means of encryptions are contemplated by the present disclosure. Each block is configured to contain a maximum number of transactions on average, depending on the magnitude of the data associated with each transaction. For example, in one non-limiting embodiment or aspect of the present disclosure, each block can contain no more than five-hundred transactions, on average. Once the maximum amount of transaction data has been encrypted into a particular block, the notary system 106 publishes the block to the chain. Upon publishing the block to the chain, the notary system 106 receives an incentive fee. Non-limiting examples of the fee include a monetary incentive, a cryptocurrency incentive, additionally allocated computational resources, or other benefits to the participant systems.

Finally, certain non-limiting embodiments or aspects of the present disclosure include a user's ability to status or oversee the participant subsystems or nodes of a particular transaction via a connected mobile device 100. Such embodiments enable account holders to initiate, monitor, and contribute to the authorization of transactions via mobile devices. As contemplated by the present disclosure, mobile devices 100 include any device or appliance capable of connecting to the network, including but not limited to personal digital assistants, smart phones, laptop computers, personal desktop computers, and mobile telephones.

Figure 2:
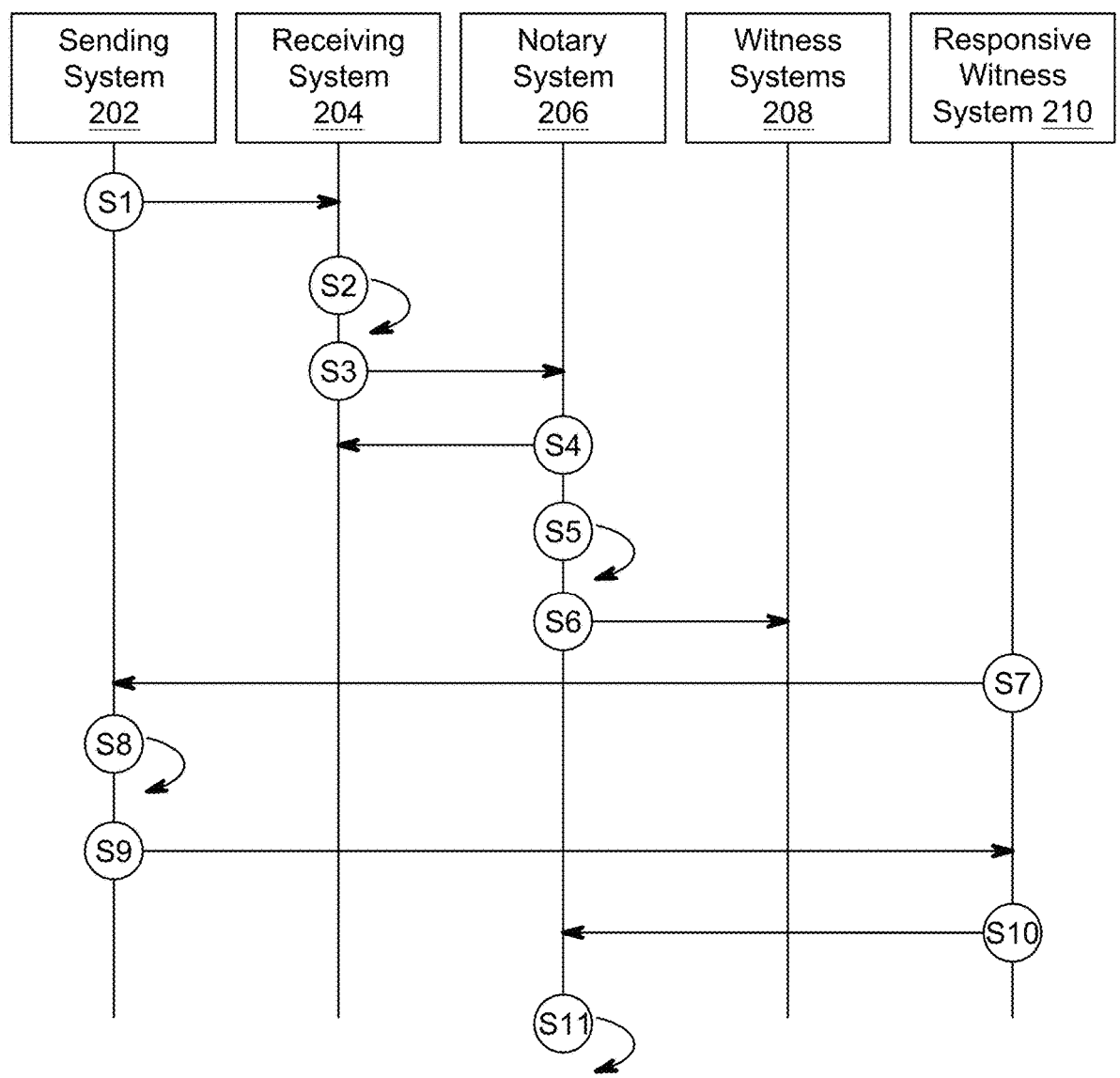
FIG. 2 is a flowchart of non-limiting embodiments or aspects of a process for authorizing transactions in a blockchain network.

Referring now to FIG. 2, a sequence diagram is shown depicting the participant systems or nodes and their respective actions according to a non-limiting embodiment of the present disclosure. As depicted, the system includes a sending system 202, a receiving system 204, at least one notary system 206, at least one witness system 208, and at least one responsive witness system 210. In step S1, the sending system 202 first sends the transaction data to the receiving system 204. The receiving system 204 then bundles data associated with the receiving system 204 with the transaction data received from the sending system 202 into a notary request, as depicted in step S2. In step S3, the receiving system 204 sends the notary request to at least one notary system 206 from a network of notary systems.

The notary system 206 then notifies the receiving system 204 that it accepts the notary request in step S4. After accepting, the notary system 206 determines a number of affirmative responses from a subset of responsive witness systems 210 required to authorize the transaction, based on the data in the notary request, as shown in step S5. Once a subset of responsive witness systems 210 has been determined, the notary system 206 sends at least a portion of the transaction data from the notary request to at least one witness system 208, thus commencing an opportunity for at least one witness system 208 to respond to the notary request, depicted in S6.

In step S7, a responsive witness system 210 from a subset of responsive witness systems queries the sending system 202 as to whether at least a portion of the transaction data received from the notary system corresponds to data that is exclusively maintained by the sending system 202. The sending system 202 compares the transaction data provided by the responsive witness system 210 with data exclusively maintained by the sending system 202 in step S8. As depicted in step S9, the sending system 202 responds to the query of the responsive witness system 210, either providing an affirmative response that confirms that the transaction data corresponds to data it exclusively maintains, or denying the request. In step S10, the responsive witness system 210 forwards the response from the sending system 202 to the notary system 206. Assuming the notary system 206 receives the determined number of affirmative responses required to authorize the transaction, the notary system 206 will encrypt the transaction data to a new block, and publish the block to the blockchain once it is filled with its maximum capacity of transaction data, depicted in step S11.

Figure 3:
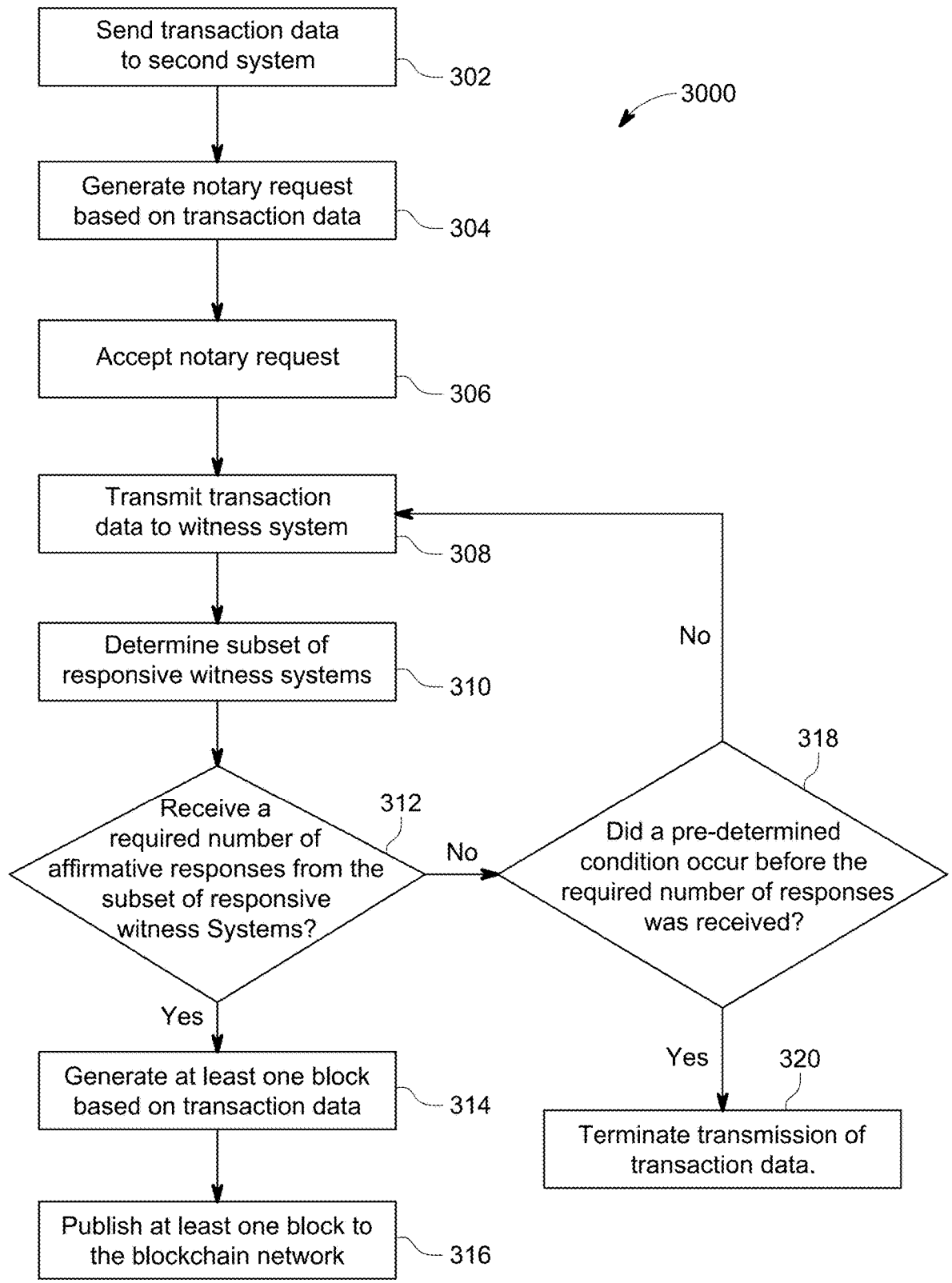
FIG. 3 is a sequence diagram of an implementation of non-limiting embodiments or aspects of a process for authorizing transactions in a blockchain network disclosed herein.

Referring now to FIG. 3, a flow diagram 3000 depicting a method for implementing a blockchain-based rewards network in accordance with a non-limiting embodiment or aspect of the present disclosure is shown. As shown in FIG. 3, the first system sends transaction data to the second system 302, and the second system generates a notary request based on at least a portion of the transaction data 304. Once a notary system is selected and accepts the notary request 306, it transmits the notary request, including the transaction data to at least one witness system 308. Upon receiving the notary request, a subset of response witness systems is determined 310.

Regarding the determination of the subset of responsive witness systems 310, the notary system can determine the required number of responses algorithmically. In such a non-limiting embodiment or aspect of the present disclosure, the notary system will consider variables such as the transaction amount, an account balance of the first system, or an account balance of the second system. For example, a sender balance percentage, calculated by dividing the transaction amount by the starting balance of the first system, can be considered. Similarly, a receiver balance percentage, calculated by dividing the transaction amount by the starting account balance of the second system, can be considered. Alternatively, the ending account balance of the first system or the ending account balance of the second system can be used to calculate the respective percentages.

Considering a sender balance percentage, a receiver balance percentage, or both when determining the number of affirmative responses required to authorize a particular transaction will enable a level of security that scales proportionally in accordance with the relative magnitude of each transaction. For example, if the notary system determines that the transaction amount represents a large percentage of the starting balance of the first system, it can require more affirmative responses prior to authorizing the transaction.

Another non-limiting embodiment or aspect of the present disclosure allows the first system, or sender, to determine the number of affirmative responses required to authorize a particular transaction. However, in determining the required number of transactions, the first system cannot require fewer responses than the number determined algorithmically, as described above. This process establishes a safeguard against human error, establishing the lowest acceptable number of required responses to authorize a particular transaction, and inhibiting or preventing the sender from failing to meet that threshold.

After a number of affirmative responses required to authorize the transaction has been determined, the notary system begins collecting affirmative responses 312. This process continues until the required number of affirmative responses has been received from the subset of responsive witness systems 314. If the required number of affirmative responses has been received, the notary system generates at least one block based on the transaction data 314. Once the block is filled to its maximum capacity with transaction data, the notary system publishes the block to the blockchain network 316 and waits to be selected for the next transaction.

However, if the required number of affirmative responses has not been received, the notary system determines whether or not a pre-determined condition occurs 318. According to certain non-limiting embodiments or aspects of the present disclosure, the pre-determined condition can include a specified period of time lapsing, or the notary system receiving the maximum allowable number of non-affirmative responses from the subset of responsive witness systems. Thus, the notary system queries whether the pre-determined condition has occurred 318. If the pre-determined condition has occurred, the notary system terminates the notary request and does not authorize the transaction 320. If the pre-determined condition has not occurred, the notary request remains open, and the notary system continues to transmit the transaction data to the network of witness systems 308.

Figure 4:
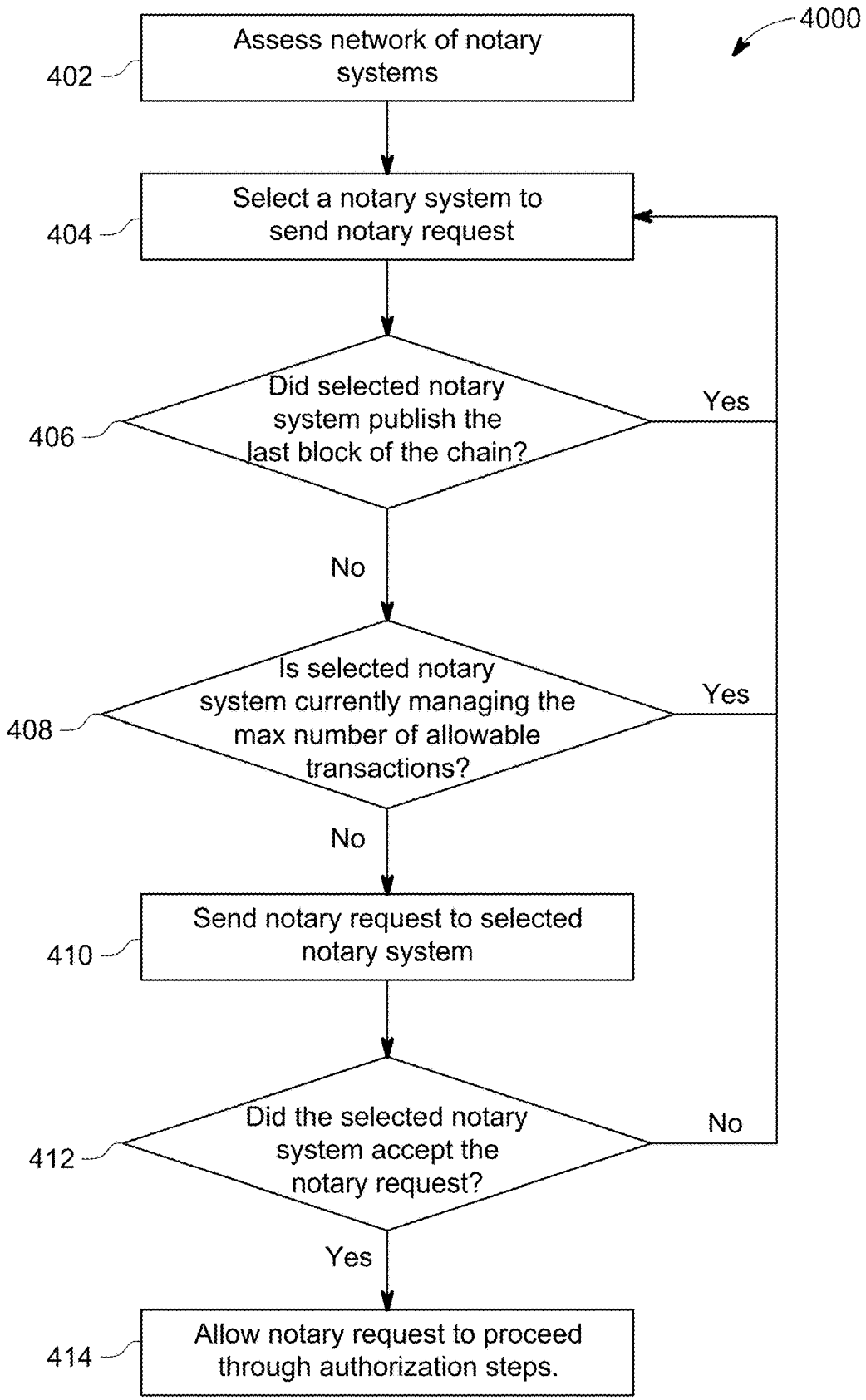
FIG. 4 is a flowchart of non-limiting embodiments or aspects of a process for authorizing transactions in a blockchain network.

Referring now to FIG. 4, a flow diagram 4000 depicting a queue-based method of selecting a notary system in accordance with a non-limiting embodiment or aspect of the present disclosure is shown. According to the non-limiting embodiment shown in FIG. 4, the receiving system assesses the network of notary systems 402, and randomly selects a notary system to potentially send the notary request 404. The receiving system first determines if the randomly selected notary system was the last notary system to publish a block to the chain 406. If the randomly selected notary system was the last to publish a block to the chain, then the receiving system selects another notary system to potentially send the notary request 404.

In response to determining that the randomly selected notary system was not the last notary system to publish a block to the chain, the receiving system then determines whether or not the randomly selected notary system is currently managing a pre-determined number of maximum allowable transactions 408. If the randomly selected notary system is currently managing a pre-determined number of maximum allowable transactions, the receiving system randomly selects another notary system to potentially send the notary request 404. However, if the randomly selected notary system is not currently managing a pre-determined number of maximum allowable transactions, the receiving system sends the selected notary system the notary request 410. The randomly selected notary system is then afforded an opportunity to accept the notary request from the receiving system 412. If the randomly selected notary system does not accept the notary request, the process is repeated with the receiving system randomly selecting another notary system to potentially send the notary request 404. However, if the randomly selected notary system accepts the notary request, the notary system proceeds through the aforementioned authorization process 414.

The non-limiting embodiment or aspect of the present disclosure of FIG. 4 eliminates the problems resulting from Proof-of-Work authorization by ensuring that there is sufficient work for all notary systems in the network independent of resource criteria. Furthermore, the problems resulting from Proof-of-Stake authorization are eliminated by ensuring that the same notary system is not simultaneously publishing blocks to the chain, thereby enhancing the overall integrity of the chain.

Figure 5:
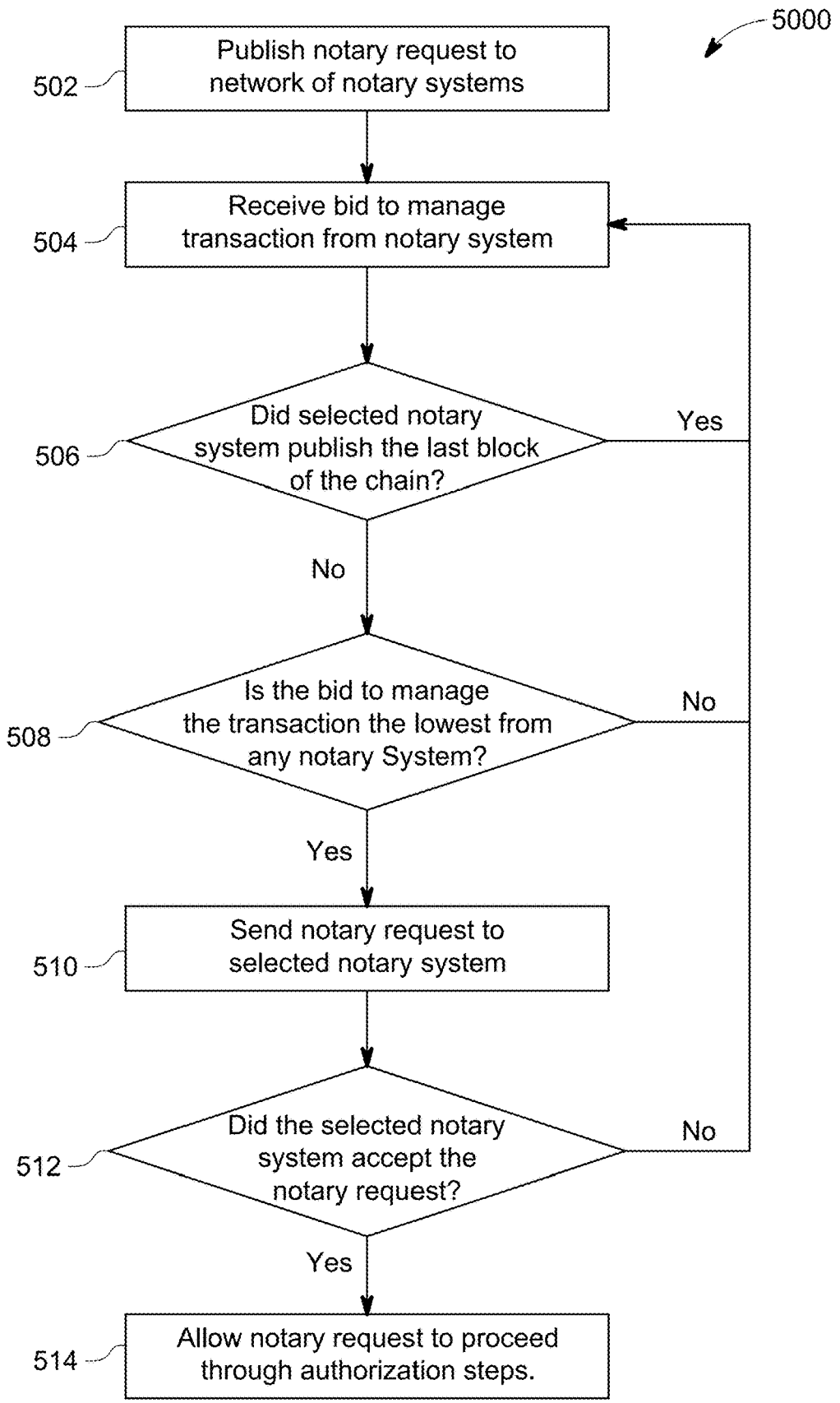
FIG. 5 is a flowchart of non-limiting embodiments or aspects of a process for authorizing transactions in a blockchain network.

Referring now to FIG. 5, a flow diagram 5000 depicting a reverse-auction method of selecting a notary system in accordance with a non-limiting embodiment or aspect of the present disclosure is shown. According to the non-limiting embodiment shown in FIG. 5, the receiving system publishes the notary request to the network of notary systems 502. The receiving system then receives at least one bid from at least one notary system to exclusively manage the transaction 504. In response, the receiving system first determines if the bidding notary system was the last notary system to publish a block to the chain 506. If the bidding notary system was the last to publish a block to the chain, then the receiving system once again sends the notary request to the network of notary systems 504.

Assuming the bidding notary system was not the last notary system to publish a block to the chain, the receiving system then determines whether or not the bidding notary system has submitted the lowest bid for the transaction 508. If the bidding notary has not submitted the lowest bid for the transaction, the receiving system selects a bid submitted by another notary system 504. However, if the bidding notary system has submitted the lowest bid for the transaction, the receiving system sends the selected notary system the notary request 510. The selected notary system is then afforded an opportunity to accept the notary request from the receiving system 512. If the selected notary system does not accept the notary request, the process is repeated with the receiving system selecting a bid from another notary system 504. However, if the selected notary system accepts the notary request, the notary system proceeds through the aforementioned authorization process 514.

Figure 6:
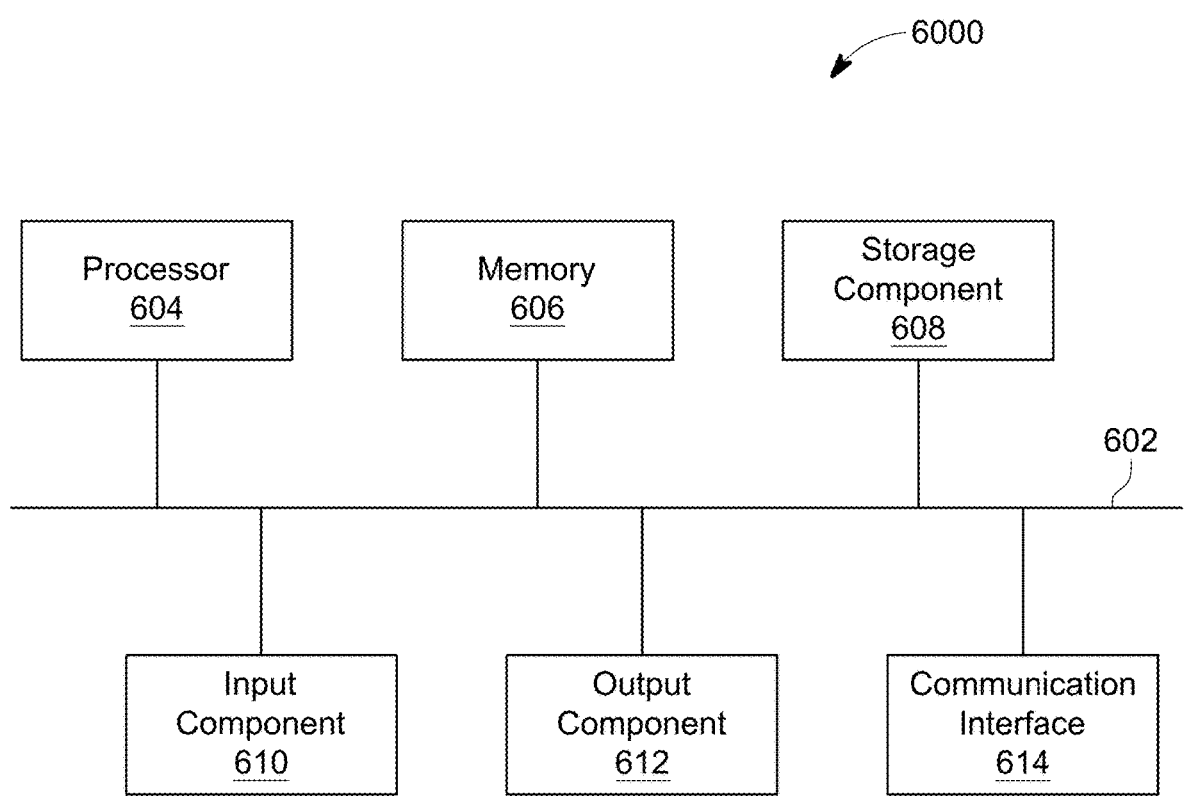
FIG. 6 is a diagram of a non-limiting embodiment or aspect of components of one or more devices and/or one or more systems of FIG. 1.

Referring now to FIG. 6, FIG. 6 is a diagram of example components of a device 6000. Device 6000 may correspond to one or more devices of system 1000, as depicted in FIG. 1. For example, device 6000 may correspond to one or more devices of first system 102, one or more devices of second system 104, notary system 106, witness system 108, and/or one or more devices of communication network 110. In some non-limiting embodiments or aspects, one or more devices of one or more devices of first system 102, one or more devices of second system 104, notary system 106, witness system 108, and/or one or more devices of communication network 110 can include at least one device 6000 and/or at least one component of device 6000. As shown in FIG. 6, device 6000 may include a bus 602, a processor 604, memory 606, a storage component 608, an input component 610, an output component 612, and a communication interface 614.

Bus 602 may include a component that permits communication among the components of device 6000. In some non-limiting embodiments or aspects, processor 604 may be implemented in hardware, firmware, or a combination of hardware and software. For example, processor 604 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 606 may include random access memory (RAM), read only memory (ROM), and/or another type of dynamic or static storage device (e.g., flash memory, magnetic memory, optical memory, etc.) that stores information and/or instructions for use by processor 204.

Storage component 608 may store information and/or software related to the operation and use of device 6000. For example, storage component 608 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 610 may include a component that permits device 6000 to receive information, such as via user input (e.g., a touch screen display, a keyboard, a keypad, a mouse, a button, a switch, a microphone, a camera, an electroencephalogram (EEG) monitor, etc.). Additionally or alternatively, input component 610 may include a sensor for sensing information (e.g., a global positioning system (GPS) component, an accelerometer, a gyroscope, an actuator, etc.). Output component 612 may include a component that provides output information from device 200 (e.g., a display, a speaker, one or more light-emitting diodes (LEDs), and/or the like).

Communication interface 614 may include a transceiver-like component (e.g., a transceiver, a separate receiver and transmitter, etc.) that enables device 6000 to communicate with other devices, such as via a wired connection, a wireless connection, or a combination of wired and wireless connections. Communication interface 614 may permit device 6000 to receive information from another device and/or provide information to another device. For example, communication interface 614 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 6000 may perform one or more processes described herein. Device 6000 may perform these processes based on processor 604 executing software instructions stored by a computer-readable medium, such as memory 606 and/or storage component 608. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 606 and/or storage component 608 from another computer-readable medium or from another device via communication interface 614. When executed, software instructions stored in memory 606 and/or storage component 608 may cause processor 604 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 606 and/or storage component 608 may include data storage or one or more data structures (e.g., a database, etc.). Device 6000 may be capable of receiving information from, storing information in, communicating information to, or searching information stored in the data storage or one or more data structures in memory 606 and/or storage component 608. For example, the information may include training data, first training data, second training data, input data, output data, transaction data, account data, or any combination thereof.

The number and arrangement of components shown in FIG. 6 are provided as an example. In some non-limiting embodiments or aspects, device 6000 may include additional components, fewer components, different components, or differently arranged components than those shown in FIG. 6. Additionally or alternatively, a set of components (e.g., one or more components) of device 6000 may perform one or more functions described as being performed by another set of components of device 6000.

The non-limiting embodiment or aspect of the present disclosure of FIG. 5 further eliminates the problems resulting from Proof-of-Work authorization by ensuring that there is sufficient work for all notary systems in the network independent of resource criteria. Furthermore, the problems resulting from Proof-of-Stake authorization are eliminated by ensuring that the same notary system is not simultaneously publishing blocks to the chain, thereby enhancing the overall integrity of the chain.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method of authorizing a transaction in a decentralized blockchain network, wherein the blockchain network comprises a plurality of notary systems configured to exclusively host and maintain a distributed ledger on a verified network, a first system, a second system, and a plurality of witness systems, wherein the first system is a sending system for a transaction, wherein the second system is a receiving system for the transaction, and wherein the first system, the second system, and the plurality of witness systems can neither host nor maintain the distributed ledger, wherein the first system is configured to send transaction data associated with the transaction to the second system, wherein the transaction data consists of a transaction amount and a public encryption key that corresponds to a private encryption key that is exclusively maintained by the first system, and wherein the second system is configured to generate a notary request comprising the transaction data, the method comprising:

accepting, by a notary system of the plurality of notary systems, the notary request from the second system of the plurality of account holder systems;

transmitting, by the notary system, the transaction data to the plurality of witness systems;

determining, by the notary system, a required number of affirmative responses from a responding witness system of the plurality of witness systems based, at least in part, on the transaction amount;

determining, by the notary system, that the required number of affirmative responses has been received, wherein each affirmative response comprises a confirmation from the responding witness system that the public key was approved by the first system;

in response to determining that the required number of responses has been received, generating, by the notary system, at least one block based, at least in part, on the transaction data; and publishing, by the notary system, the at least one block to the distributed ledger.

2. The computer-implemented method of claim 1, wherein the verified network is inaccessible to the first system, the second system, and the plurality of witness systems, and wherein the determination that the required number of affirmative responses has been received, generation of the at least one block, and publication of the at least one block to the distributed ledger occurs exclusively on the verified network.

3. The computer-implemented method of claim 2, wherein the notary system is randomly selected from the plurality of notary systems, and wherein the notary system is not a notary system that last published a block to the blockchain network.

4. The computer-implemented method of claim 2, wherein the notary system is selected by determining whether the notary system is managing a current number of transactions that is less than a maximum allowable number of transactions.

5. The computer-implemented method of claim 2, wherein the notary system is selected by determining that a bid accompanying an acceptance of the notary system is lower than another bid accompanying another acceptance of another notary system of the plurality of notary systems.

6. The computer-implemented method of claim 1, wherein the determination of the required number of affirmative responses from a responding witness system of the plurality of witness systems is further based, at least in part, on a sender balance percentage based on the transaction amount and an account balance of the first system, and a receiver balance percentage based on the transaction amount and an account balance of the second system.

7. The computer-implemented method of claim 1, wherein the notary request further comprises additional data associated with the second system, bundled with the transaction data by the second system.

8. The computer-implemented method of claim 7, wherein the additional data comprises at least one of the following: an account identifier of the second system, a public encryption key of the second system, a starting account balance of the second system, an ending account balance of the second system, or any combination thereof.

9. The computer-implemented method of claim 8, wherein each affirmative response received by the notary system further comprises data including at least one of: a key, a timestamp, a transaction amount associated with the transaction data, or any combination thereof.

10. The computer-implemented method of claim 1, wherein the transaction data is cryptographically integrated into the at least one block.

11. The computer-implemented method of claim 10, wherein the cryptographic integration is based on at least one hash function.

12. The computer-implemented method of claim 1, wherein the notary system receives a fee in response to publishing the at least one block to the blockchain network.

13. The computer-implemented method of claim 1, wherein the subset of responsive witness systems receives a fee in response to publishing the at least one block to the blockchain network.

14. The computer-implemented method of claim 1, wherein at least one of the plurality of witness systems comprises a smart phone.

15. A system for authorizing transactions in a decentralized blockchain network comprising a plurality of notary systems configured to exclusively host and maintain a distributed ledger and a first system, a second system, and a plurality of witness systems, wherein the first system is a sending system for a transaction, wherein the second system is a receiving system for the transaction, and wherein the first system, the second system, and the plurality of witness systems can neither host nor maintain the distributed ledger, wherein the first system is configured to send transaction data associated with the transaction to the second system, wherein the transaction data comprises a transaction amount and a public encryption key that corresponds to a private encryption key that is exclusively maintained by the first system, and wherein the second system generates a notary request comprising the transaction data, wherein a notary system of the plurality of notary systems comprises at least one processor configured to:

accept a notary request from a second system, the notary request comprising the transaction data received from the first system;

transmit at least a portion of the transaction data to the plurality of witness systems;

determine a required number of affirmative responses from a responding witness system of the plurality of witness systems;

determine that the required number of affirmative responses has been received, wherein each affirmative response confirms that the public key was approved by the first system;

generate at least one block at least partially based on the transaction data, in response to determining that the required number of responses from each of the subset of responsive witness systems is received; and publish the at least one block to the blockchain network.

16. The system of claim 15, wherein the transaction data further comprises at least one of the following: data associated with an account identifier of the first system; a public encryption key of the first system; a starting account balance of the first system; an ending account balance of the first system; a transaction amount; an account identifier of the second system; a public encryption key of the second system; a starting account balance of the second system; an ending account balance of the second system; or any combination thereof.

* * * * *